March 8, 1932. J. MOREAU 1,848,265
POTATO DIGGER
Filed June 27, 1930 3 Sheets-Sheet 2
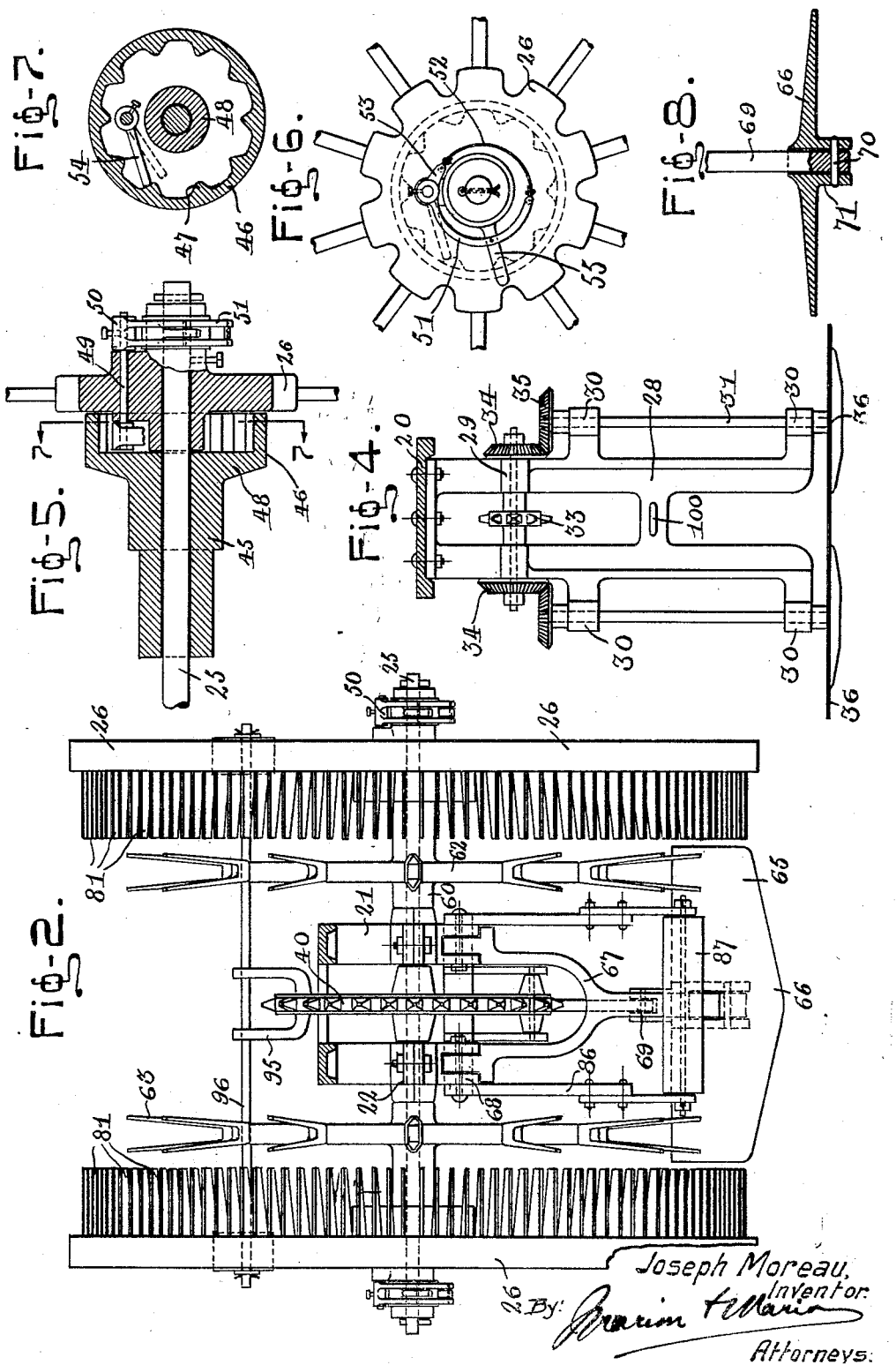
Joseph Moreau, Inventor.
Attorneys.

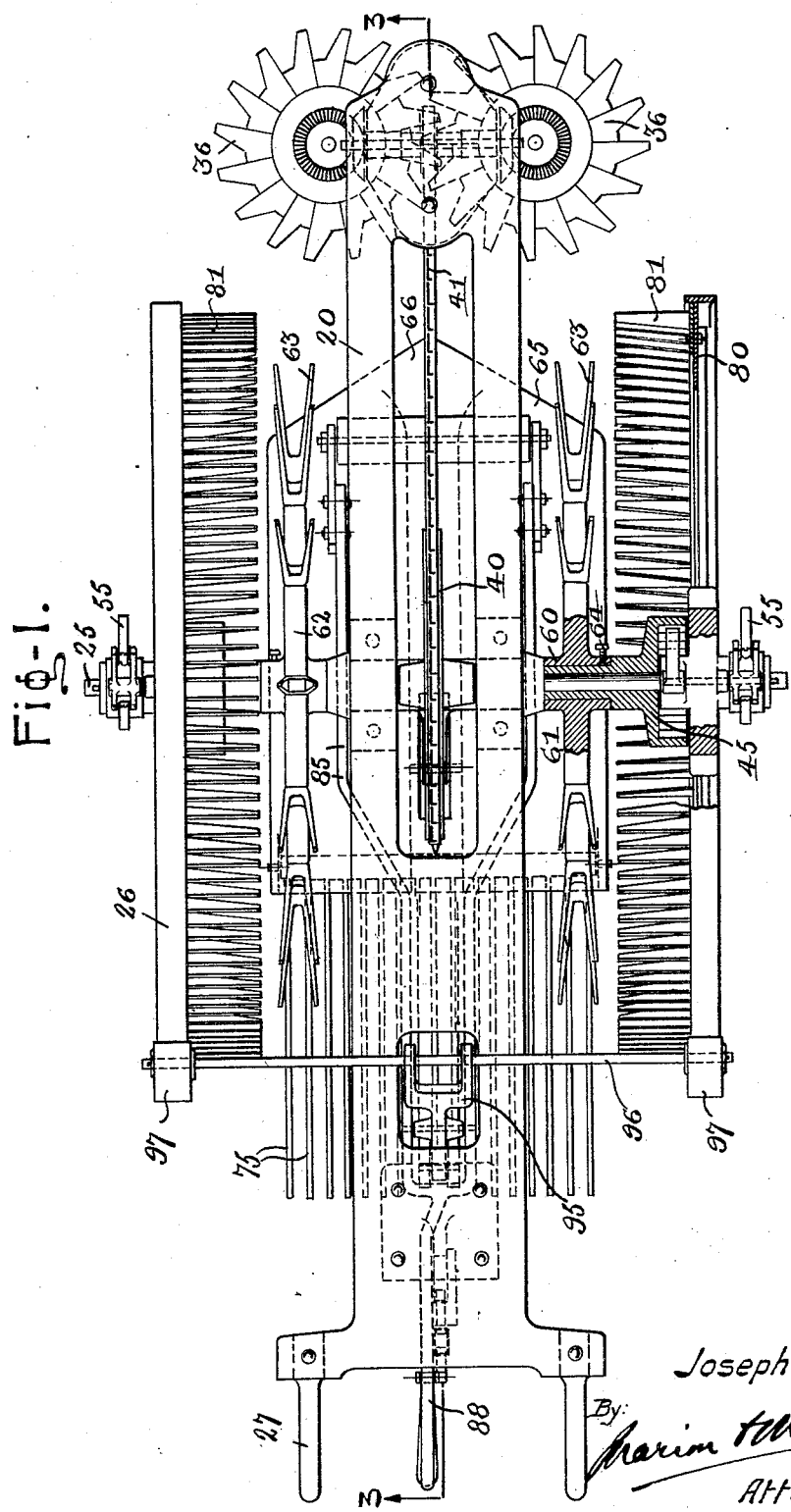

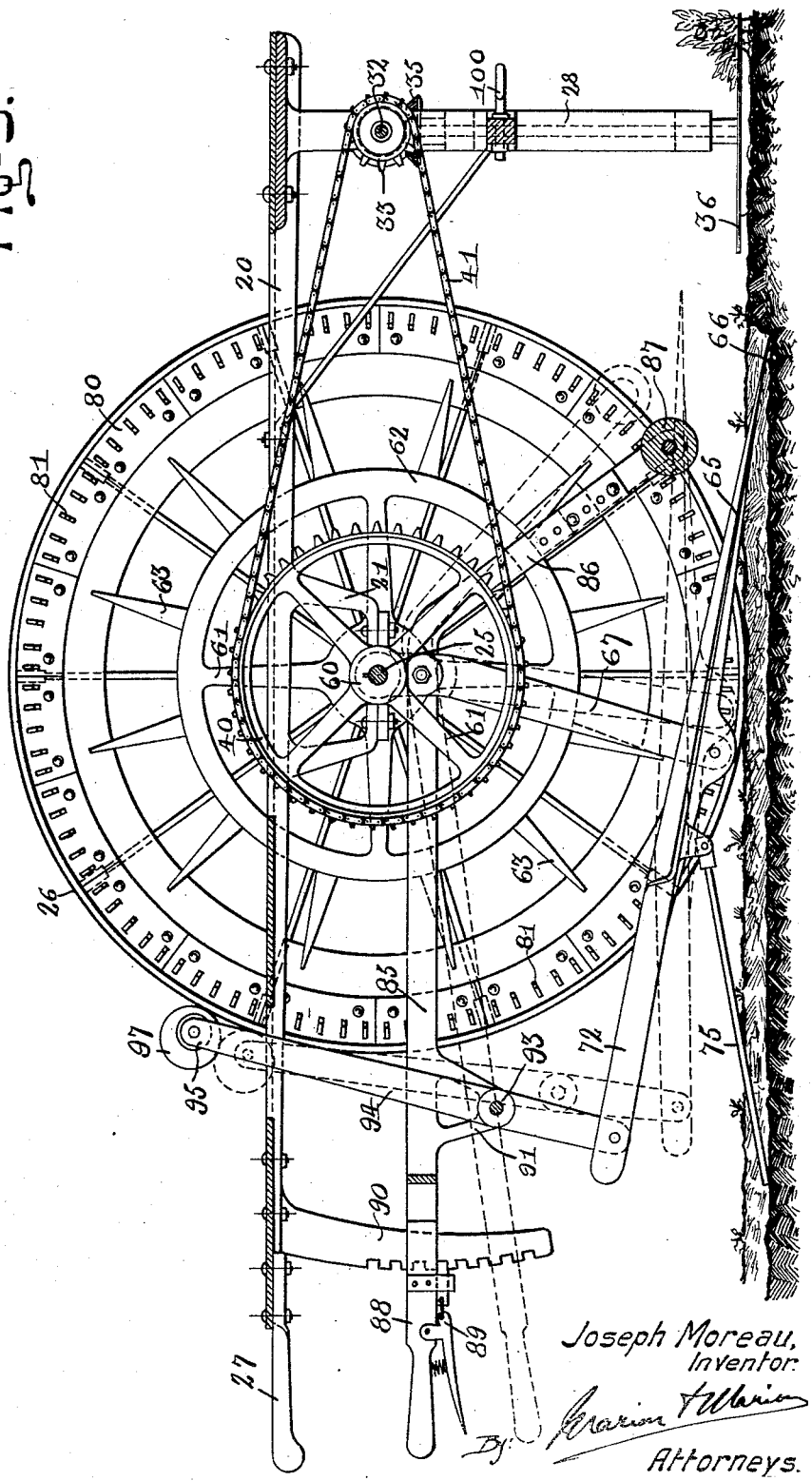

Patented Mar. 8, 1932

1,848,265

UNITED STATES PATENT OFFICE

JOSEPH MOREAU, OF VILLE ST. PIERRE, QUEBEC, CANADA

POTATO DIGGER

Application filed June 27, 1930. Serial No. 464,335.

The present invention relates to improvements in machines for harvesting vegetable root crops, such as potatoes and the like, and particularly to a machine of the type generally known as a potato digger.

An important object of the invention is the provision of a machine designed for automatically digging the potatoes and for separating therefrom the dirt, vines and other foreign matter.

A further object of the invention is the provision of a potato digging machine of the above character which is constructed so as to avoid bruising or otherwise injuring the vegetable.

Another object of the invention is the provision of a machine of the above character designed to cut the vegetable vines prior to the digging operation.

Still another object of the invention is the provision of a potato digging machine embodying a reciprocating digging member designed to facilitate the digging of the potatoes.

Other objects and advantages of the invention will become apparent as the description progresses.

In the accompanying drawings forming a part of this specification and in which like reference characters are employed to designate corresponding parts throughout the same:

Figure 1 is a top plan view of the assembled machine,

Figure 2 is a front elevational view of the same,

Figure 3 is a vertical longitudinal section taken on the line 3—3 of Figure 1,

Figure 4 is a front elevational view of the vine cutting mechanism,

Figure 5 is an enlarged fragmentary transverse section showing a clutch mechanism of the machine, Figure 6 is a fragmentary elevational view of the carrier wheel hub and clutch structure, Figure 7 is a transverse sectional view taken on the line 7—7 of Figure 5, and Figure 8 is a fragmentary transverse section through the digging member.

Referring to the drawings, wherein for the purpose of illustration is shown a preferred embodiment of the invention, the numeral 20 generally designates the main frame piece which embodies a longitudinally elongated bar extending horizontally and provided with suitable apertures. At the intermediate portion thereof, the main frame bar 20 is formed with horizontally opposed bearing brackets 21 having bearings 22 formed in the lower sections thereof.

Journaled transversely through the opposed bearings 22 is a main axle 25 having rigidly fastened upon its opposed ends a pair of relatively large carrier wheels 26.

At the rear end of the frame bar 20 are formed rearwardly projecting handles 27. To the front portion of the bar 20 is secured a forward vertically depending auxiliary frame 28 formed with transversely opposed bearings 29 in opposed sections adjacent the upper end. Projecting laterally from each side of the auxiliary frame 28 are a pair of vertically aligned bearings 30 in each complementary pair of which is journaled a vertical shaft 31.

In the upper transverse bearings 29 is journaled a relatively short transverse shaft 32 having fixed on its central portion a relatively small toothed sprocket wheel 33. On the outwardly projecting ends of the shaft 32 are fixed bevel gears 34 arranged to constantly mesh with complementary bevel gears 35 fixed on the upper ends of the side shafts 31.

To the lower extremities of the side shafts 31 are secured cutter wheels 36, each of which embodies a plurality of radially extending blades formed with outer tapered projections arranged to co-operate in intermeshing relation.

Keyed upon the central portion of the main shaft 25 is a relatively large toothed sprocket wheel 40, connected by means of an endless drive chain 41 with the small forward sprocket 33.

On each side of the main shaft 25, between the frame bearings 22 and the carrier wheel hubs, are fitted sleeves 45 having their inner portions reduced and formed at their outer ends with diametrically enlarged drums 46. At regular intervals the inner periphery of each drum 46 is formed with inwardly projecting lugs 47, as shown to advantage in Figure 7. The hubs of the carrier wheels 26 are formed with reduced inwardly projecting sleeves 48 disposed concentrically within the drums 46. Extending through the carrier wheel hubs and rotatable therein are clutch shafts 49 having attached to the outer ends a bearing 50 keyed to the shafts. From the bearing 50 is extended a semi-circular bracket 51 which connects with an arcuate spring 52, the opposed end of which is secured to a lug 53. On the inner end of the shaft 49 is secured a detent 54 operable to engage the lugs 47 when swung outwardly or, to assume an inwardly disposed lug disengaging position. Rotatably connected with the outer reduced portion of the carrier wheel hub is a hand lever 55 having connection with the arcuate bracket 51 for rotatable adjustment of the shaft 49 and the detent 54.

Thus, by actuating the hand lever 55 in one direction, the shaft 49 and detent 54 may be actuated so that the detent will engage the lugs 47 and lock the sleeve 45 in association with the carrier wheel hub. By opposed movement of the hand lever 55, the detent may be disengaged from the lugs so that the sleeve 45 will be free upon the axle to provide an effective clutch mechanism.

Rotatably disposed upon the reduced portion of each sleeve 45 is the hub 60 of a spider 61. Secured to each spider 61 is annular rim 62 having formed thereon at spaced intervals a plurality of outwardly projecting radial forks 63, forming a pair of transversely opposed annular fork wheels. Each of the fork wheels is preferably fastened to a sleeve 45 by means of a set screw 64.

Suspended below the wheeled frame and disposed between the carrier wheels thereof, is a digging member of substantially longitudinally elongated rectangular form providing a relative flat plough blade 65. At the front, the plough blade is provided with a tapering ground engaging point 66. The upper face of the blade 65 is formed so that the side portions are slightly inclined from a longitudinal central rib downwardly to the side edges, as shown to advantage in Figure 8, designed to direct the potatoes toward the carrier wheels. The blade is supported by means of a yoke bracket 67 having the upper divided ends pivotally connected with bifurcated projections 68 depending from the lower sections of the frame bearings 22. The lower portion of the yoke 67 is formed to provide a depending centrally disposed standard 69, the lower end of which projects through an aperture in the blade and is secured by a pin 70 with ears 71 formed at each side of the aperture at the lower side of the plough.

The central longitudinally extending rib on the upper face of the plough blade is prolonged to form a rearwardly projecting lever 72, the purpose of which will be later described.

Pivotally connected with brackets depending from the rear portion of the blade and having a rearward downward inclination is a rack 75 embodying a plurality of parallel rearwardly directed rods disposed in uniformly spaced positions, as shown to advantage in Figures 1 and 3.

Each of the carrier wheels 26 is provided with an annular flange 80 disposed adjacent the outer rim portion to which are rigidly connected a series of inwardly directed axial tines 81 arranged at uniformly spaced intervals and having the inner edges beveled so as to provide a diminishing taper toward the outer ends thereof. The tines 81 substantially form a pair of cylindrical open work drums disposed to receive a portion of the potatoes gathered by the machine to provide seperator means adapted to loosen the dirt from the potatoes.

Pivotally connected with the depending bearing extensions 68 and disposed for vertical tilting adjustment is a subordinate frame embodying a pair of elongated bars 85 connecting with the pivot pins in the bearing extensions having their forward portions bent to normally assume a downwardly inclined position, as indicated at 86. To the lower portions of the inclined sections 86 is connected a transversely extending roller 87 adapted to normally assume a position immediately above the forward end portion of the digging member. The upper portions of the bars 85 extend rearwardly and converge immediately in the rear of the main sprocket wheel 40, the bars extending in close proximity over the rack structure 75 and connecting by a cross bar substantially above the rear end thereof. A handle portion 88 extends rearwardly from the cross bar and carries a conventional form of locking mechanism 89. The locking mechanism 89 co-operates with a toothed quadrant 90 attached to the rear portion of the main frame bar 20 and depending downwardly therefrom.

On the rear end portions of the side arms 85 are formed depending opposed bearing bracket 91 having journaled therein a transversely extending bearing pin 92 which also extends through a bearing 93 arranged intermediate the ends of a rocker bar 94. The lower end of the rocker bar 94 is pivotally connected with the rear end portion of the lever 72 which projects rearwardly from the digging blade. The upper extremity of the rocker bar extends through an aperture in the main frame bar 20 and is formed, at the upper extremity with a bifurcated bracket extension 95 fastened to the intermediate portion of a transversely extending shaft 96.

On the opposed ends of the shaft 96 are journaled annular rollers 97 having an eccentric bore formed transversely therethrough to receive the ends of the rod 96. The rollers 97 are disposed to engage the exterior peripheral edge of the carrier wheels 26 and to be rotated during the rotary movement of the wheels. Thus, during the movement of the wheeled frame, the eccentrically mounted rollers 97 will impart a rocking movement to the bar 94 and produce a relatively rapid reciprocating movement in the digging member 65.

In harvesting potatoes or similar root crops, it is considered preferable to initially run the machine over the rows to sever the vines or above ground portions of the plant. This is accomplished by vertically adjusting the lower subordinate frame structure so that the rear portion, indicated at 88, will be swung downwardly, simultaneously lowering the rocker bar 94 and the rear end portion of the lever 72. By this adjustment, the forward portion of the plough will be elevated to a position substantially above the ground surface, as indicated in dotted lines in Figure 3. By thus tilting the subordinate frame 85, the forward roller 87 is also swung through an upward arc to assume an elevated position in correspondence with the elevated adjustment of the forward end portion of the digging member. The machine is then driven over the rows, the carrier wheels 26 preferably being spaced to operate between the rows of plants. During the movement of the machine, the forward complementary cutter wheels 36 will be rotated and moved directly over the ground, the cutter wheels being driven through the medium of the chain 41 connecting the drive sprocket 40 with the transmission sprocket 33 so as to cause the right hand wheel to rotate in counter clockwise movement while the adjacent left hand cutter will rotate in a clockwise movement so as to cleanly sever the stems of the vines adjacent the ground.

After the vine cutting operation, the machine is again driven over the rows of plants to effect the digging and separating operations. For this purpose, the rear end portion 88 of the subordinate frame is returned to its normal elevated position and adjusted, with respect to the quadrant 90, so that the front end of the plough blade 65 will assume a suitable depth in the ground. The machine is then driven over the rows, preferably by means of draft animals connected with an eye bolt 100 attached to the intermediate portion of the front auxiliary frame 28 and guided by means of the rear handles 27. As the machine is thus driven over the rows of potato plants, the forward submerged end of the plough blade is constantly reciprocated at a predetermined depth so that the potatoes, as well as a portion of the earth, will be forced upwardly on the inclined top surface thereof. The roller 87 will prevent the potatoes and earth from turning upwardly and will cause the same to travel thereunder on the plough blade. The ploughed material wil be directed to the intermediate side portions of the blade due to the inclination thereof, a portion being delivered directly on to the lower laterally extending tines 81 to be agitated and shaken thereon, so as to the loosen the dirt and foreign matter from the potatoes. When the potatoes are separated from the dirt and foreign matter, they are, due to the inclination of the drum teeth 81 directed on to the elevated portion of the plough blade and from thence driven rearwardly by the rotary radial fork members 63. The potatoes are thus forced on to the rearwardly inclined rack 75 and deposited on the ground in the rear of the machine.

It is to be understood that the form of my invention herein shown and described is to be taken as a preferred example of the same, and that various changes as to shape, size, and arrangement of parts may be resorted to without departing from the spirit of the invention or the scope of the subjoined claims.

Having thus described my invention, I claim:

1. A machine of the character described comprising a frame, carrier wheels supporting the said frame, an inclined digging member suspended from the frame, a rocker bar having one end connected with an extension of the digging member, and an eccentric roller connected with the opposed end of the rocker bar having frictional contact with the peripheral portions of the carrier wheels adapted to impart reciprocating movement to the digging member during the operative movement of the machine.

2. A machine of the character described comprising a frame, carrier wheels supporting the said frame, a reciprocating digging member suspended from the frame, and a pair of shaker drums attached to the carrier wheels and extending laterally thereof.

3. In a machine of the character described, the combination of a frame, carrier wheels supporting the said frame, a digging member suspended from the frame, mechanism for imparting reciprocating movement to the digging member, separating drums attached to and extending laterally from the carrier wheels, and a pair of rotary wheels having outward radially projecting forks disposed to rotate vertically over the digging member and convey the matter elevated thereon rearwardly of the machine.

In witness whereof I have hereunto set my hand.

JOSEPH X MOREAU.
his mark